United States Patent
Berglund et al.

(10) Patent No.: US 9,098,512 B2
(45) Date of Patent: Aug. 4, 2015

(54) METHOD AND DEVICE FOR GENERATING A PRESENTATION

(71) Applicant: Research In Motion Limited, Waterloo (CA)

(72) Inventors: Carl Fredrik Alexander Berglund, Malmö (SE); Marcus Eriksson, Malmö (SE); Michael Erik Winberg, Malmö (SE)

(73) Assignee: BlackBerry Limited, Waterloo, Ontario (CA)

( * ) Notice: Subject to any disclaimer, the term of this patent is extended or adjusted under 35 U.S.C. 154(b) by 314 days.

(21) Appl. No.: 13/630,933

(22) Filed: Sep. 28, 2012

(65) Prior Publication Data

US 2014/0096006 A1     Apr. 3, 2014

(51) Int. Cl.
*G06F 3/0481*    (2013.01)
*G06F 17/30*     (2006.01)
*G06T 13/80*     (2011.01)

(52) U.S. Cl.
CPC .......... *G06F 17/30056* (2013.01); *G06T 13/80* (2013.01)

(58) Field of Classification Search
CPC ......... G06F 3/00; G06F 3/048; G06F 3/0481; G06F 9/44543; G06T 13/40
USPC ................... 715/730, 732, 764, 765; 345/473
See application file for complete search history.

(56) References Cited

U.S. PATENT DOCUMENTS

| | | | |
|---|---|---|---|
| 6,396,500 B1 | 5/2002 | Qureshi et al. | |
| 7,454,077 B1 | 11/2008 | MacKenzie et al. | |
| 8,924,889 B2 * | 12/2014 | Hunleth et al. | 715/800 |
| 2003/0090506 A1 * | 5/2003 | Moore et al. | 345/730 |
| 2008/0019610 A1 * | 1/2008 | Matsuzaka et al. | 382/284 |
| 2010/0064223 A1 | 3/2010 | Tilton | |
| 2010/0088605 A1 | 4/2010 | Livshin et al. | |
| 2010/0238176 A1 * | 9/2010 | Guo et al. | 345/440 |
| 2011/0181602 A1 | 7/2011 | Boda et al. | |
| 2011/0265005 A1 * | 10/2011 | Zhao et al. | 715/732 |
| 2013/0346843 A1 * | 12/2013 | Murray et al. | 715/212 |

* cited by examiner

*Primary Examiner* — Xiomar L Bautista
(74) *Attorney, Agent, or Firm* — Fish & Richardson P.C.

(57) ABSTRACT

A computer-implemented method of generating a presentation including a plurality of slides, the method comprising: storing a first slide and a second slide, each slide having one or more content elements; selecting, based on the one or more content elements of the first slide or the second slide or both, a slide transition from a set of slide transitions, each slide transition in the set of slide transitions defining how display of one slide changes to display of another slide; displaying the first slide; and, subsequently changing display of the first slide to display of the second slide in accordance with the selected slide transition. An electronic device and computer program product are also provided.

17 Claims, 8 Drawing Sheets

METHOD AND DEVICE FOR GENERATING A PRESENTATION

TECHNICAL FIELD

The disclosed embodiments relate to an electronic device and a method of generating a presentation. In particular, the disclosed embodiments relate to a method of generating a presentation including a plurality of slides.

BACKGROUND OF THE INVENTION

Typically, when designing a presentation using conventional presentation tools, the author will design the presentation using a standard slide transition for each slide. The slide transition defines how the display one slide changes into the display of another slide. For example, the author may choose that the content of the slide animates into the slide from the left.

Although this slide transition may be appropriate for some content types and sizes, this transition may look ugly and cumbersome for others. When designing the presentation manually, choosing an appropriate slide transition may be frustrating and time-consuming. This problem is exacerbated on portable electronic devices where the user input and interface is limited in functionality such that manually defining the slide transitions becomes even more awkward. If design is automated, it may not be appropriate to select a slide transition for all slides of a presentation.

It is desirable to improve the readability of a presentation and its appearance to an audience and therefore improve audience enjoyment, understanding, interest and participation.

BRIEF DESCRIPTION OF THE DRAWINGS

Examples of the present invention will now be described in detail with reference to the accompanying drawings, in which.

DESCRIPTION OF EMBODIMENTS

Figure 1:
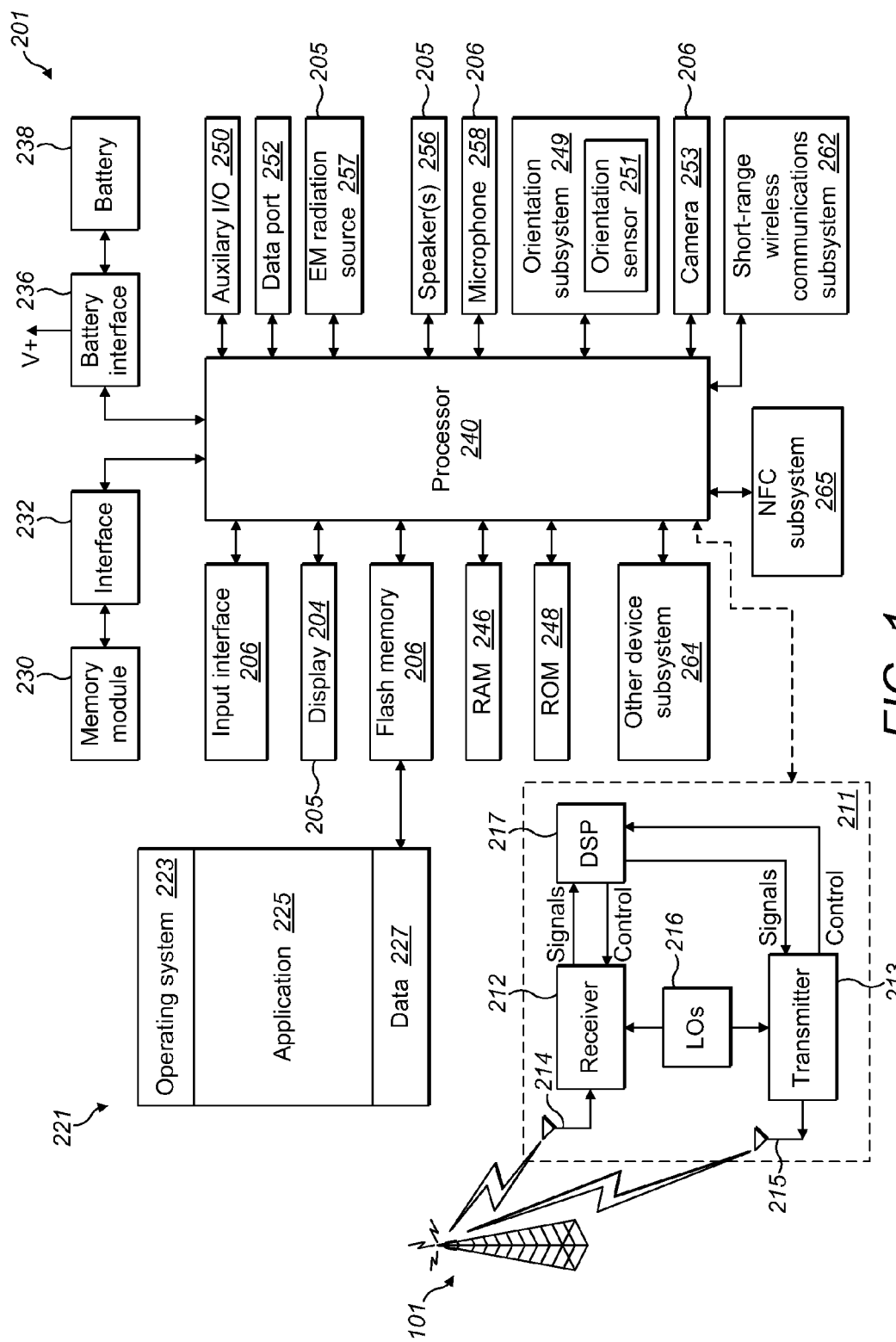
FIG. 1 is a block diagram illustrating an electronic device in accordance with example embodiments of the present disclosure.

According to one aspect of the present disclosure, there is provided a computer-implemented method of generating a presentation including a plurality of slides. The method comprising: storing a first slide and a second slide, each slide having one or more content elements; selecting, based on the one or more content elements of the first slide or the second slide or both, a slide transition from a set of slide transitions, each slide transition in the set of slide transitions defining how display of one slide changes to display of another slide; displaying the first slide; and, subsequently changing display of the first slide to display of the second slide in accordance with the selected slide transition. In this way, the audience interactivity with the presentation is dramatically improved and the visual appearance of the presentation is enhanced thus improving the readability. Cumbersome and time consuming manual input and editing is obviated.

The selecting may be based on the number of content elements in the first slide or the number of content elements in the second slide or both. In this way if there is a small number of content elements on the slide an appropriate slide transition will be selected which may be different from an appropriate slide transition for a large number of content elements.

The selecting may be based on content type of the one or more content elements of the first slide or the content type of the one or more content elements of the second slide or both. Thus, for example, image or text elements may have different transitions.

The selecting may be based on a characteristic of the one or more content elements of the first slide or a characteristic of the one or more content elements of the second slide or both, the characteristic defining an aspect of the graphical appearance and layout of the one or more content elements. In this way, the transitions are tailored to the content elements of the slides. The characteristic may be selected from the group consisting of: type face, font weight, font size, font colour, image contrast, image saturation, font contrast, font saturation, background colour and background effect.

The selecting may be based on one or more dimensions of the respective region covered by the one or more content elements of the first slide or the region covered by the one or more content elements of the second slide or both. In this way, a large content element may have a different transition to a small content element, that is, the content element will cover a larger region on the slide.

The selecting may be based on comparison of the one or more content elements of the first slide with the one or more content elements of the second slide. The transition between slides is therefore made as seamless as possible.

The first slide or second slide or both may contain a plurality of content elements of different content types, and wherein the slide transition selected may define a different animation for each content type. In this way, different content types may have different transitions so as to appear in the most visually appealing way to the user.

According to another aspect of the present disclosure, there may be provided an electronic device for generating a presentation including a plurality of slides, the device comprising: one or more processors; and, memory comprising instructions which, when executed by one or more of the processors, cause the electronic device to: store a first slide and a second slide, each slide having one or more content elements; select, based on the one or more content elements of the first slide or the second slide or both, a slide transition from a set of slide transitions, each slide transition in the set of slide transitions defining how display of one slide changes to display of another slide; display the first slide; and, subsequently change display of the first slide to display of the second slide in accordance with the selected slide transition.

According to another aspect of the present disclosure, there may be provided a computer program product for generating a presentation including a plurality of slides, the computer program product comprising memory comprising instructions which when executed by one or more of the processors of an electronic device cause the electronic device to: store a first slide and a second slide, each slide having one or more content elements; select, based on the one or more content elements of the first slide or the second slide or both, a slide transition from a set of slide transitions, each slide transition in the set of slide transitions defining how display of one slide changes to display of another slide; display the first slide; and, subsequently change display of the first slide to display of the second slide in accordance with the selected slide transition.

The present disclosure is described in the context of an electronic device and particularly a portable electronic device. However the skilled person would understand that the present disclosure is applicable to any presentation software and any electronic device. Examples of portable electronic devices include mobile, or handheld, wireless communication devices such as pagers, cellular phones, cellular smartphones, wireless organizers, personal digital assistants, wirelessly enabled notebook computers, wirelessly enabled tablet computers and so forth. The portable electronic device may also be a portable electronic device without wireless communication capabilities, such as a handheld electronic game device, digital photograph album, tablet computer, digital camera, or other device.

Reference will now be made to FIG. 1 which illustrates an example electronic device 201 in which example embodiments described in the present disclosure can be applied. It will be appreciated that one or more of the electronic devices 201 suitable for use with the present disclosure may be of a type which differs from the electronic device 201 of FIG. 1 and that some of the features, systems or subsystems of the electronic device 201 discussed below with reference to FIG. 1 may be omitted from electronic devices 201 which implement the principles of the present disclosure.

In the illustrated example embodiment, the electronic device 201 is a communication device and, more particularly, is a mobile communication device having data and voice communication capabilities, and the capability to communicate with other computer systems; for example, via the Internet. It will, however, be appreciated that the electronic device 201 may take other forms, including any one of the forms listed above.

Depending on the functionality provided by the electronic device 201, in various example embodiments the electronic device 201 may be a multiple-mode communication device configured for both data and voice communication, a mobile telephone, such as a smartphone, a wearable computers such as a watch, a tablet computer such as a slate computer, a personal digital assistant (PDA), or a computer system. The electronic device 201 may take other forms apart from those specifically listed above. The electronic device may also be referred to as a mobile communications device, a communication device, a mobile device and, in some cases, as a device.

The electronic device 201 includes a controller including one or more processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 is communicably coupled with additional device subsystems including one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)) associated with a touchscreen display 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NFC) subsystem 265, a short-range communication subsystem 262 and other device subsystems generally designated as 264. Some of the subsystems shown in FIG. 1 perform communication-related functions, whereas other subsystems may provide "resident" or on-device functions.

In at least some example embodiments, the electronic device 201 may include a touchscreen display which acts as both an input interface 206 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller. In at least some example embodiments, the touch-sensitive overlay may have a touch-sensitive input surface which is larger than the display 204. For example, in at least some example embodiments, the touch-sensitive overlay may extend overtop of a frame 312 (FIG. 3) which surrounds the display 204. In such example embodiments, the frame 312 (FIG. 3) may be referred to as an active frame since it is capable of acting as an input interface 206. In at least some example embodiments, the touch-sensitive overlay may extend to the sides of the electronic device 201.

As noted above, in some example embodiments, the electronic device 201 may include a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate.

In at least some example embodiments, the electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analogue-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analogue (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some example embodiments, the auxiliary input/output (I/O) subsystems 250 may include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some example embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In at least some example embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some example embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analogue output signals depending on the type of accelerometer.

An orientation sensor 251 may generate orientation data which specifies the orientation of the electronic device 201. The orientation data, in at least some example embodiments, specifies the orientation of the device 201 relative to the gravitational field of the earth.

In some example embodiments, the orientation subsystem 249 may include other orientation sensors 251, instead of or in addition to accelerometers. For example, in various example embodiments, the orientation subsystem 249 may include a gravity sensor, a gyroscope, a tilt sensor, an electronic compass or other suitable sensor, or combinations thereof. In some example embodiments, the device orientation subsystem 249 may include two or more orientation sensors 251 such as an accelerometer and an electronic compass.

The electronic device 201 may, in at least some example embodiments, include a near field communications (NFC) subsystem 265. The NFC subsystem 265 is configured to communicate with other electronic devices 201 and/or tags, using an NFC communications protocol. NFC is a set of short-range wireless technologies which typically require a distance of 4 cm or less for communications. The NFC subsystem 265 may include an NFC chip and an NFC antenna.

The electronic device 201 may include a microphone and/or one or more speakers. In at least some example embodiments, an electronic device 201 may include a plurality of speakers 256. For example, in some example embodiments, the electronic device 201 may include two or more speakers 265. The two or more speakers 256 may, for example, be disposed in spaced relation to one another. That is, in at least some example embodiments, the electronic device 201 may include a first speaker and a second speaker and the first speaker and the second speaker may be spatially separated from one another within the electronic device 201. In at least some example embodiments, the display 204 may be disposed between the first speaker and the second speaker of the electronic device. In such example embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display.

In at least some example embodiments, each speaker 256 may be associated with a separate audio channel. The multiple speakers may, for example, be used to provide stereophonic sound (which may also be referred to as stereo).

The electronic device 201 may also include one or more cameras 253. The one or more cameras 253 may be capable of capturing images in the form of still photographs or motion video.

In at least some example embodiments, the electronic device 201 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201 and/or the housing of the electronic device 201. In such example embodiments, the direction of capture of the camera is always predictable relative to the display 204 and/or the housing. In at least some example embodiments, the camera may be provided in a central location relative to the display 204 to facilitate image acquisition of a face.

In at least some example embodiments, the electronic device 201 includes an electromagnetic (EM) radiation source 257. In at least some example embodiments, the EM radiation source 257 is configured to emit electromagnetic radiation from the side of the electronic device which is associated with a camera 253 of that electronic device 201. For example, where the camera is a front facing camera 253, the electronic device 201 may be configured to emit electromagnetic radiation from the front face of the electronic device 201. That is, in at least some example embodiments, the electromagnetic radiation source 257 is configured to emit radiation in a direction which may visible by the camera. That is, the camera 253 and the electromagnetic radiation source 257 may be disposed on the electronic device 201 so that electromagnetic radiation emitted by the electromagnetic radiation source 257 is visible in images obtained by the camera.

In some example embodiments, the electromagnetic radiation source 257 may be an infrared (IR) radiation source which is configured to emit infrared radiation. In at least some example embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some example embodiments, the camera 253 is configured to capture at least some electromagnetic radiation which is not in the visible spectrum.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 includes a short-range communication subsystem 262 which provides for wireless communication between the electronic device 201 and other electronic devices 201. The short-range communication subsystem 262 may be used to provide a common user interface (UI) mode between the electronic device 201 and another electronic device 201 which may, in at least some example embodiments, be an electronic device 201 which is the same or similar to the electronic device 201 discussed with reference to FIG. 1. In at least some example embodiments, the short-range communication subsystem 262 is a wireless bus protocol compliant communication mechanism such as a Bluetooth® communication module to provide for communication with similarly-enabled systems and devices.

The electronic device 201 stores data 227 in an erasable persistent memory, which in one example embodiment is the flash memory 244. In various example embodiments, the data 227 includes service data including information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 may, in some example embodiments, be a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 may also compose data items, such as email messages; for example, using the input devices in conjunction with the display 204. These composed items may be transmitted through the communication subsystem 211 over the wireless network 101.

In the voice communication mode, the electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225.

The software applications 225 on the electronic device 201 may also include a range of additional applications, including for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (e.g. the display 204) according to the application.

The software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

A predetermined set of applications that control basic device operations, including data and possibly voice communication applications will normally be installed on the electronic device 201 during or after manufacture. Additional applications and/or upgrades to the operating system 223 or software applications 225 may also be loaded onto the electronic device 201 through the wireless network 101, the auxiliary I/O subsystem 250, the data port 252, the short-range communication subsystem 262, or other suitable subsystem 264. The downloaded programs or code modules may be permanently installed; for example, written into the program memory (i.e. the flash memory 244), or written into and executed from the RAM 246 for execution by the processor 240 at runtime.

As discussed above, electronic devices 201 may take a variety of forms. For example, in at least some example embodiments, one or more of the electronic devices which are configured to enter a common user interface mode with another electronic device may be a smartphone.

Figure 2:
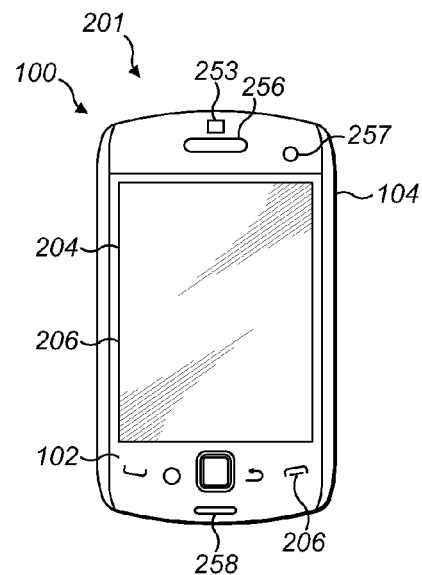
FIG. 2 is a front view of a smartphone in accordance with example embodiments of the present disclosure.

Referring now to FIG. 2, a front view of an example electronic device 201 which is a smartphone 100 is illustrated. The smartphone 100 is a mobile phone which offers more advanced computing capability than a basic non-smartphone cellular phone. For example, the smartphone 100 may have the ability to run third party applications which are stored on the smartphone.

The smartphone 100 may include the components discussed above with reference to FIG. 1 or a subset of those components. The smartphone 100 includes a housing 104 which houses at least some of the components discussed above with reference to FIG. 1.

In the example embodiment illustrated, the smartphone includes a display 204, which may be a touchscreen display which acts as an input interface 206. The display 204 is disposed within the smartphone 100 so that it is viewable at a front side 102 of the smartphone 100. That is, a viewable side of the display 204 is disposed on the front side 102 of the smartphone. In the example embodiment illustrated, the display 204 is framed by the housing 104.

The example smartphone 100 also includes other input interfaces 206 such as one or more buttons, keys or navigational input mechanisms. In the example illustrated, at least some of these additional input interfaces 206 are disposed for actuation at a front side 102 of the smartphone.

The example smartphone also includes a speaker 256. In the example embodiment illustrated, the smartphone includes a single speaker 256 which is disposed vertically above the display 204 when the smartphone 100 is held in a portrait orientation where its height is longer than its width. The speaker 256 may be disposed on the front face of the smartphone 100.

While the example smartphone 100 of FIG. 2 includes a single speaker 256, in other example embodiments, the smartphone 100 may include a greater number of speakers 256. For example, in at least some example embodiments, the smartphone 100 may include a second speaker 256 which is disposed vertically below the display 204 when the smartphone is held in a portrait orientation where its height is longer than its width (i.e. the orientation illustrated in FIG. 2).

The example smartphone 100 also includes a microphone 258. In the example illustrated, the microphone 258 is vertically disposed below the display 204 when the smartphone is held in the portrait orientation. The microphone 258 and at least one speaker 256 may be arranged so that the microphone is in close proximity to a user's mouth and the speaker 256 is in close proximity to a user's ear when the user holds the phone to their face to converse on the smartphone.

The example smartphone 100 also includes a front facing camera 253 which may be located vertically above the display 204 when the smartphone 100 is held in a portrait orientation where its height is longer than its width. The front facing camera 253 is located so that it may capture images of objects which are located in front of and/or surrounding the front side of the smartphone 100.

The example smartphone 100 also includes an electromagnetic radiation source 257. The electromagnetic radiation source 257 is disposed on the front side 102 of the smartphone 100. In this orientation, electromagnetic radiation which is produced by the electromagnetic radiation source 257 may be projected onto objects which are located in front of and/or surrounding the front side of the smartphone 100. Such electromagnetic radiation (or the projection of electromagnetic radiation onto objects) may be captured on images obtained by the camera 253.

Figure 3:
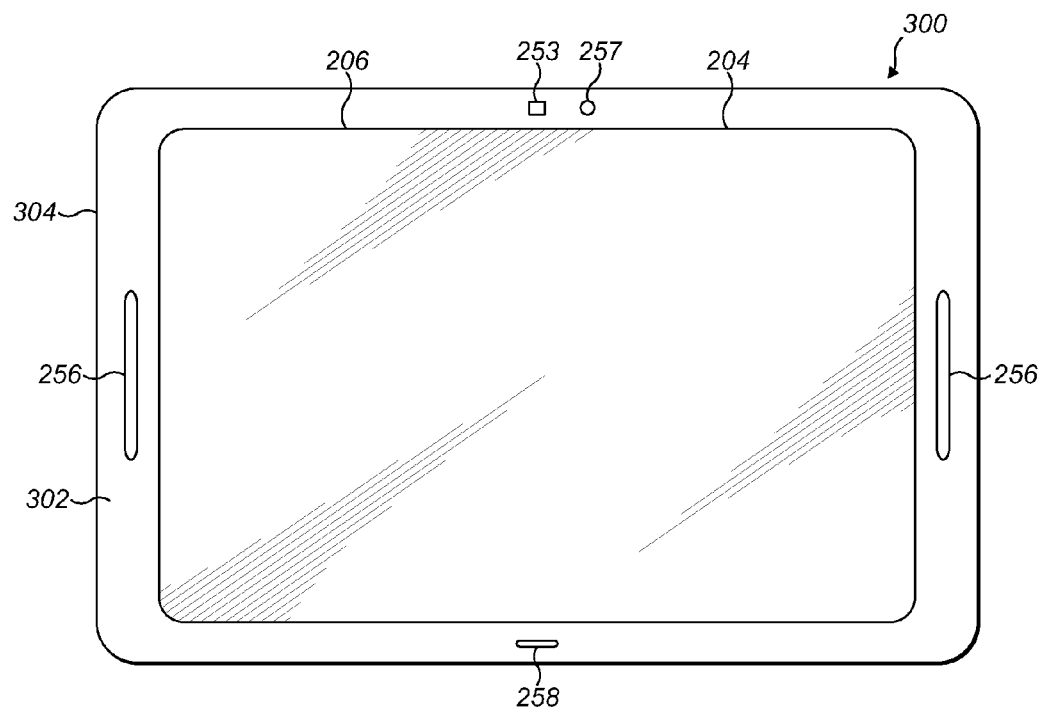
FIG. 3 is a front view of a tablet computer in accordance with example embodiments of the present disclosure.

In at least some example embodiments, the one or more of the electronic devices 201 may be a tablet computer. Referring now to FIG. 3, a front view of an example electronic device 201 which is a tablet computer 300 is illustrated.

The tablet computer 300 of FIG. 3 may include many of the same features and components of the smartphone 100 of FIG. 2. However, the tablet computer 300 of FIG. 3 is generally larger than the smartphone 100 of FIG. 2. The tablet computer 300 may include the components discussed above with reference to FIG. 1 or a subset of those components. The tablet computer 300 includes a housing 304 which houses at least some of the components discussed above with reference to FIG. 1.

The tablet computer 300 includes a display 204, which may be a touchscreen display which acts as an input interface 206. The display 204 is disposed within the tablet computer 300 so that it is viewable at a front side 302 of the tablet computer 300. That is, a viewable side of the display 204 is disposed on the front side 302 of the tablet computer 300. In the example embodiment illustrated, the display 204 is framed by the housing 304.

A frame 312 surrounds the display 204. The frame 312 is portion of the housing 304 which provides a border around the display 204. In at least some example embodiments, the frame 312 is an active frame 312. That is, the frame has a touch sensitive overlay which allows the electronic device 201 to detect a touch applied to the frame thus allowing the frame 312 to act as an input interface 206 (FIG. 1).

The example tablet computer 300 includes a plurality of speakers 256. In the example embodiment illustrated, the tablet includes two speakers 256. The two speakers 256 are disposed on opposing sides of the display 204. More particularly, when the tablet computer 300 is held in a landscape orientation (such as the orientation illustrated in FIG. 3) where its width is longer than its height, one of the two speakers is disposed on a right side 306 of the display 204 and one of the speakers is disposed on the left side 308 of the display 204. Both speakers 256 are disposed on the front side 302 of the tablet computer 300.

The example tablet computer 300 also includes a microphone 258. In the example illustrated, the microphone 258 is vertically disposed below the display 204 when the tablet computer is held in the landscape orientation illustrated in FIG. 3. The microphone 258 may be located in other locations in other example embodiments.

The example tablet computer 300 also includes a front facing camera 253 which may be located vertically above the display 204 when the tablet computer 300 is held in a landscape orientation (i.e. the orientation of FIG. 3). The front facing camera 253 is located so that it may capture images of objects which are located in front of and/or surrounding the front side of the tablet computer 300.

The example tablet computer 300 also includes an electromagnetic radiation source 257. The electromagnetic radiation source 257 is disposed on the front side 304 of the tablet computer 300. In this orientation, electromagnetic radiation which is produced by the electromagnetic radiation source 257 may be projected onto objects which are located in front of and/or surrounding the front side 302 of the tablet computer 300. Such electromagnetic radiation (or the projection of electromagnetic radiation onto objects) may be captured on images obtained by the camera 253.

Public speakers giving talks in the business and education fields often make use of visual aids. Ever since the advent of Microsoft®'s PowerPoint® program, a common visual aid has been a slide-based presentation consisting of a set of 'slides' which are displayed to the audience. The term 'slide' in the present context is a metaphor for photographic slides—small glass or plastic transparencies through which light was projected—that, prior to the digital information age, were commonly used to display a sequence of images to audiences. The slides generated and shown via presentation software are actually digital information comprising text and images. Each slide generally acts as a visual aid to a portion of the talk given by the speaker. The speaker will advance through the set of slides as the talk progresses so that the audience sees the visual aid most relevant to that portion of the talk. The set of slides is usually referred to as a 'presentation' or as a 'slide-based presentation;' the two terms will be used interchangeably throughout the present description.

Generally, the presentation is displayed to the audience on an external display that either reflects or emits light. Often a projector is used to project each slide onto a surface the audience can see, such as a reflective screen (designed for the purpose) or even a bare wall; the audience sees each slide as light reflected by the external display (the screen or wall). Alternatively, the presentation is displayed using a large monitor—again suitable for viewing by the audience members—such as an LCD, LED, or plasma monitor; in such case, the audience sees each slide as light emitted by the external display (the monitor). An additional element of the presentation is typically a set of notes for the presenter. These notes are not displayed to the audience but may be shown on the electronic device so that only the presenter can see them.

Although the presentation may be displayed using a projector or a monitor, the content of the presentation itself is often provided to the projector or monitor using a separate electronic device. It will be understood that the device may alternatively be integral with the projector or monitor. The separate electronic device may be in the form of a personal computer, smartphone or tablet device such as those described above. The speaker may control the presentation using an input device integral with the separate electronic device or using a separate remote control.

A presentation program is a computer software package which is often used to generate and present a presentation. The functionality of such a program typically includes: the ability to load and store presentations; the ability to edit presentations by adding, deleting, and altering elements (text, images, and other features such as bullets, hyperlinks, and buttons to trigger sounds or videos) and modes of animating slides (by, for example, revealing, moving, or hiding elements) or transitioning between consecutive slides; and the ability to show the presentation (by means of an external display) in either a fully automated manner, a semi-automated manner, or a fully speaker-controlled manner.

Figure 4:
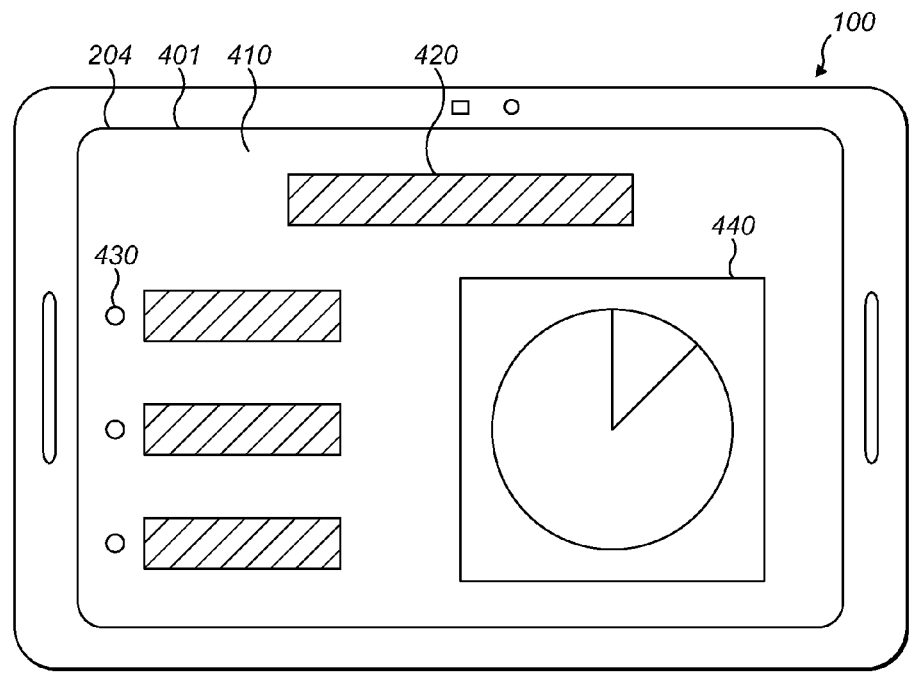
FIG. 4 is an illustration of a slide-based presentation displayed on a tablet computer.

FIG. 4 illustrates an electronic device 100 displaying on a display 204, a slide 401 of a presentation. The slide 401 of a presentation can be described as an arrangement of elements, where the elements displayed are used to deliver information or to add to the aesthetics of the slide or both. For example, the slide 401 displayed in FIG. 4 contains a background 410, a title 420, bullet points 430 and an image 440. Each of these elements may be customisable in the presentation program used to generate the presentation, for example the background 410 may be altered to a different colour, pattern, or picture; the title 420 and bullet points 430 may display different text in different font sizes and colours; and the image 440 may be a graphical representation of data, like a pie chart, or may serve a more aesthetic purpose, such as providing a visual cue.

Figure 5:
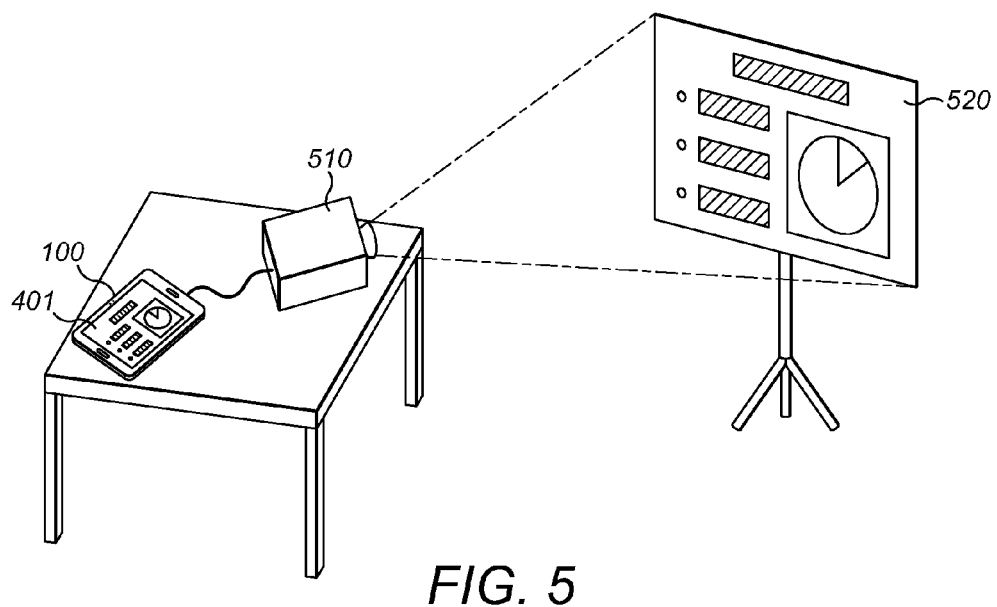
FIG. 5 is an illustration of an electronic device connected to a projector displaying a presentation.

FIG. 5 shows an electronic device 100 being used to present a presentation 401. The electronic device 100 is connected to external hardware 510 that can display the presentation larger than an internal display 204 of the electronic device 100. The connection may be made by a physical connection (as shown) or may be connected wirelessly to external hardware 510. The external hardware 510 may, for example, be a large monitor, or a projector 510 for displaying the presentation 401 on a reflective screen 520, or a distribution system for broadcasting the presentation to users remotely.

In a slide-based presentation, a presentation is made up of many slides 401, each of which may provide a different arrangement of elements. Although slide-based presentations are the most common type used, the proposed solution is envisioned to be applicable to more complex presentations as well. For example, a presentation may not be made up of a set of discrete slides, but may instead be made up of one large, continuous arrangement of elements that covers a larger area than the display 204, and which may be traversed to display different regions of the arrangement of elements at a time. In another example embodiment, the presentation may be dynamically generated, where the arrangement of elements is automatically generated based on real-time user input and context-based intelligence, and therefore the 'slide' is simply the current arrangement of elements being presented.

In a slide-based presentation, a 'theme' defines the layout of the content elements on the slide as well as the graphical appearance of each content element. For example, the theme may define that if a slide is to have a title 420, it is to be placed along a central vertical axis of the slide and substantially near to the top when the slide is displayed. The theme may also define that the title 420 may have a particular font face, font size, font weight and colour and may or may not be placed in front of a coloured background region.

Examples of the variable characteristics of a theme include:
- font face, size and colour;
- contrast and saturation of fonts;
- contrast and saturation of images;
- background colour;
- background effect, for example an animated background effect such as a live wallpaper; and,
- slide transitions and animations, for example, how text, bullet points and images move into and out of focus both within a single slide when one slide has multiple bullets or paragraphs and between different slides.

It will be understood that the above are merely examples and it will be clear that there are any number of characteristics possible that may define the graphical appearance and layout of a presentation. The characteristics of the elements can be set independently. For example, single paragraphs and images can have a different appearance. Paragraphs with different settings can be rendered on the same slide.

As briefly mentioned above, a slide transition defines how the display of one slide changes into the display of another. The slide transition defines how paragraphs, images and bullets for example are animated when they appear on the screen and when they disappear. All types of transformations and transparency modifications can combine to create an individual slide transition. In a very simple exemplary slide transition, the content elements currently being displayed on the slide may fade away, that is become increasingly transparent until they disappear, and the next set of content elements may fade into view, that is become increasingly opaque until they are fully displayed. In another simple example, the content elements may move from outside the boundaries of the slide to their final display position. Multiple animations can be combined to form a complete slide transition. For example, the displayed content elements can fade away, whilst the upcoming content elements of the next slide can move into position from outside of the slide boundaries.

Generally, slide transitions in presentation software are highly customisable. In the fade example briefly described above, the fade could be customised by setting at least the duration and opacity of the fade. Additionally, slide transitions may be both audio and visual, for example, the fade above may be accompanied by a sound matching the fade.

As well as the location of the elements on the screen and the movement of the elements as they approach their final resting location, the characteristics described above in the context of a theme may contribute to a slide transition. For example, a block of text may increase from a small font size to a final font size when the block of text appears on the slide. Generally slide transitions are the animation of the content items as they appear on the slide and then further animation as they disappear from view. The slide transition may govern the appearance and disappearance of individual content elements independently, or the slide of content elements as a whole.

To further explain the concept of a slide transition, a number of specific examples of slide transitions will be described. In a first example, a 'slide' slide transition may comprise a content element, such as an image, starting outside the boundaries of the displayed slide and horizontally moving into a final position on the displayed slide. In this transition the content element may move from the left or the right provided the movement is substantially horizontal when it appears on the display and moves into its final position. The movement of the element thus mimics a 'slide' movement.

In a 'flip' transition example, one or more of the content elements on the slide may rotate until they are no longer visible, that is the reverse side of the element not shown in normal display has the same colour or effect as the background of the slide. The content elements of the second slide which is to be viewed after the first slide may also rotate into view in the same or in an opposing direction.

In a 'zoom' transition example, the content elements of the slide may start small and progressively increase in size until they reach their final display size. Of course the zoom could be reversed and the content elements may start large and decrease in size until they reach their final display size.

In a 'fly' transition example, the content elements may start outside the boundaries of the slide and move into their final position at a particular angle so that it appears the elements are flying. The angle itself may be curved in some transitions.

In a 'push' transition example, the content elements may appear onto the slide vertically, starting from a position outside the boundaries of the slide. When the content elements are removed from the slide they may disappear vertically but in the opposite direction from which they appeared. Thus, the content elements appear to be pushed off the slide by the content elements of the arriving slide. Although it is described that this 'push' transition may be vertical, in fact the movement of the elements may be any arbitrary angle provided that the content elements disappear at the opposite angle from which they arrived.

In a 'cover' transition example, the content elements of the arriving slide are moved into position while the content elements of the previous slide remain in place. It thus appears that the content elements of the second slide cover the content elements of the first slide.

Some transitions are particularly suited to certain types of content. For example, a 'dissolve' transition example may be particularly suited to transitioning to or from an image. In the 'dissolve' transition, small portions of the content element are taken away or inserted until the complete content element is produced or removed. When this content element is text, the transition is not smooth because a large portion of the content element is blank space.

In other slide transitions, the entire slide may be treated as a whole where the content elements are not transitioned individually. Of course this approach is equally applicable to the slide transitions described above. Slide transitions which are particularly suited to the whole slide include a 'shuffle' transition where the slide is treated like a card of a pack of cards and the approaching slide is shuffled into place, replacing the previous slide. In a 'rotate' transition example, the entire slide is rotated in one direction with the next slide being rotated into place in the same direction. This results in the slides appearing to be positioned on two adjacent sides of a cube, with the cube being rotated in order to display the next slide.

As is clear from the above, there are myriad slide transitions possible. A slide transition can be considered to be a transformation or transparency modification from one slide to the next.

In accordance with the present disclosure, a presentation generation engine or presentation software may be operable to determine the most appropriate slide transition to be used to change display from one slide to another based on the content of the slides. The transition selected may be based on the content of the first slide or the content of the second slide. The selection may take place automatically by the presentation generation engine or the presentation software.

To demonstrate this concept, in a first example a first slide may include a text paragraph. The presenter indicates that the presentation should move to the next slide, that is, the second slide. This slide also includes a text paragraph. The slide transition selected for this transition is based on the fact that a text paragraph is changing to another text paragraph. In this example, the chosen transition dictates that the first paragraph will move towards the top and gradually fade out with a mask. A mask determines the opacity of a content element. The new paragraph animates in from below in a similar manner.

If instead of a text paragraph, the second slide contains an image, the slide transition chosen may be different because the software has determined that the slide transition is going from a text paragraph to an image. In this example, the slide transition dictates that the text paragraph moves to the left and fades out with a mask while the image appears from the same place and moves to the right. In this way, the slide transition is entirely appropriate to the content and the visual appeal of the presentation is improved whilst minimising the manual user input. In this specific example, a content element appears to pushed off the screen by one the same type, but a content element appears to be replaced by one of a different type. The audience member thus appreciates the seamless transition from one slide to another.

In the two examples described above, the slide transition is based on the type of the content elements, such as text or image. In addition to the slide transition being chosen on the basis of the type of the content element of the slide, the slide transition may be selected based on the size of the content element or the dimensions of region occupied by the element on the slide. For example, a different slide transition may be used for a small image to a large image. A large image for example might suit a 'dissolve' transition described above because it uses are large amount of the displayed slide. This transition may be unsuitable for a small image because the blocks used to put together or dissolve the image may be too small for the audience to see. A small image like this may be more suited to a 'fly' transition where it appears from outside the boundaries of the slide. Since it is small, it has space to move into position. A large image might not suit a 'fly' transition because it has no space to move before it reaches its final position. In another example, a 'zoom' from small to large transition would not suit a small image but would suit a large image and vice versa for a 'zoom' from large to small transition.

In a further example, if a paragraph of text is too long to fit inside the specified layout region that has been reserved for paragraphs, the paragraph can automatically be split into two or more 'virtual' paragraphs that are handled as two separate pieces of text. The transition from the first part to the second part is faster and uses different start positions than a transition between two normal paragraphs to indicate that these two 'virtual' paragraphs belong together. For example, the first part can animate down and dock with the second part. Both parts can animate upwards towards the centre and then the first part can animate out of the slide upwards while the second part stays in the centre. Thus, the transition signifies to the user that the two parts of the paragraph belong together. If the selection of the transition was not based on the content elements, then the two parts might use a 'push' transition which might indicate that the text elements are distinct and unrelated.

Figure 6:
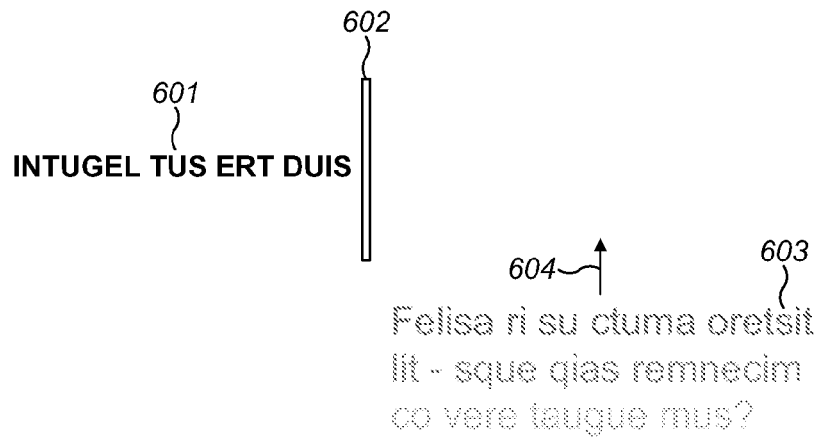
FIG. 6 is an illustration of a first exemplary slide transition of a presentation in accordance with example embodiments of the present disclosure.

Referring now to FIGS. 6 to 14, a number of more specific examples will be described. Each of FIGS. 6 to 14 illustrates the display at a particular point in time. In the first illustration, FIG. 6, a number of content elements are shown. A title 601 is position to the left of the slide, separated from the region designated for the detailed content of the slide by a separating bar 602. For the purposes of this illustration, it is assumed that the previous slide showed merely the title 601 and the separating bar 602. The illustration in FIG. 6 shows the slide transition of a text content element 603, the text content element 603 moving into place. Arrow 604 shows the movement of the text content element 603. In this particular slide transition, the text content is gradually made more opaque as it moves into position. In the implementation, the opacity will most likely be controlled with a mask.

Figure 7:
FIG. 7 is an illustration of a first exemplary slide of a presentation in accordance with example embodiments of the present disclosure.

FIG. 7 illustrates a slide showing the final resting position of the text content element 603. The title 601, separating bar 602 and the text content 603 are shown in place and fully opaque. This is in comparison to the illustration of FIG. 6, where the text content element 603 is shown moving into place and gradually being made more opaque.

Figure 8:
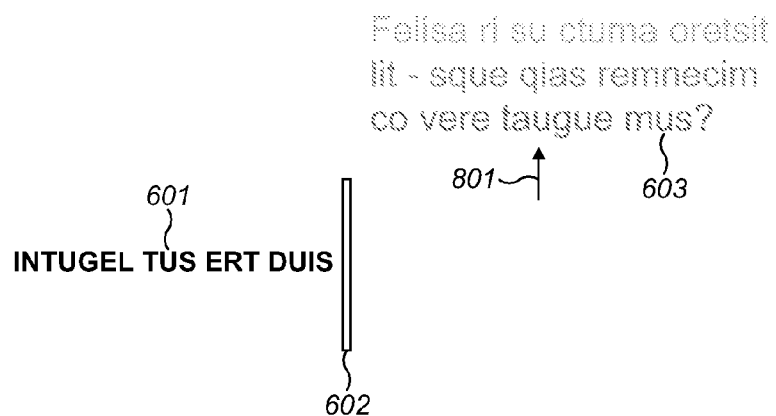
FIG. 8 is an illustration of a second exemplary slide transition of a presentation in accordance with example embodiments of the present disclosure.
Figure 9:
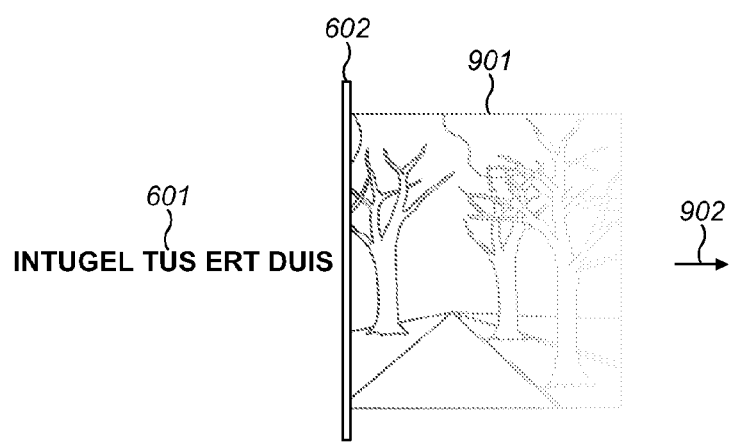
FIG. 9 is an illustration of a third exemplary slide transition of a presentation in accordance with example embodiments of the present disclosure.
Figure 10:
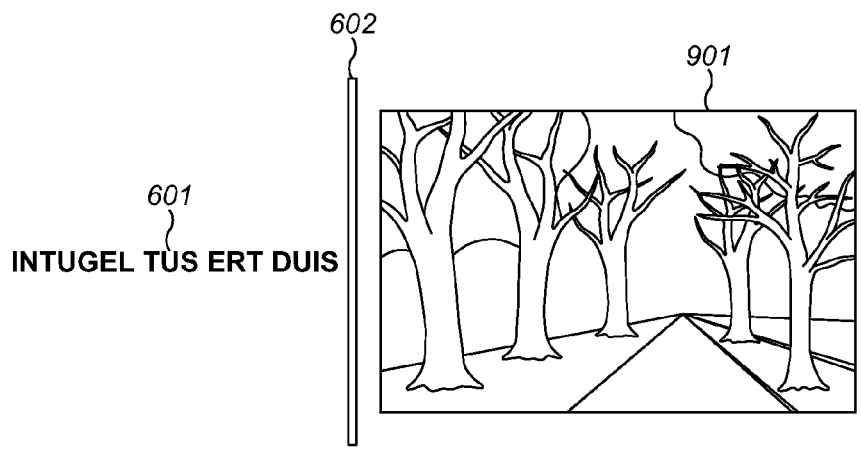
FIG. 10 is an illustration of a second exemplary slide of a presentation in accordance with example embodiments of the present disclosure.

FIG. 8 illustrates the slide transition of the text content element 603 disappearing, in readiness for the next slide which illustrated in FIG. 10. In the first slide illustrated in FIG. 7, the text content element 603 is fully opaque. In the slide transition illustrated in FIG. 8, the text content element 603 moves in the direction indicated by arrow 801, that is, vertically off the slide. As the text content element 603 moves off the slide, it gradually becomes more transparent. The title 601 and separating bar 602 remain in place.

Once the text element 603 has disappeared from view, the next slide is ready to be transitioned into view. In this instance, the next slide contains an image content element 901. The presentation generation engine or presentation software determines that the content element is an image and selects the slide transition accordingly. In the slide transition illustrated in FIG. 9, the title 601 remains in place. The separating bar 602 expands to match the size of the content element. The image content element 901, moves in the direction indicated by arrow 902 and appears from out of the separating bar 602. The image content element 901 gradually appears and becomes more opaque as it moves into view. As will be seen, the slide transition for the image content element 901 is different from the slide transition for the text content element 603.

Figure 11:
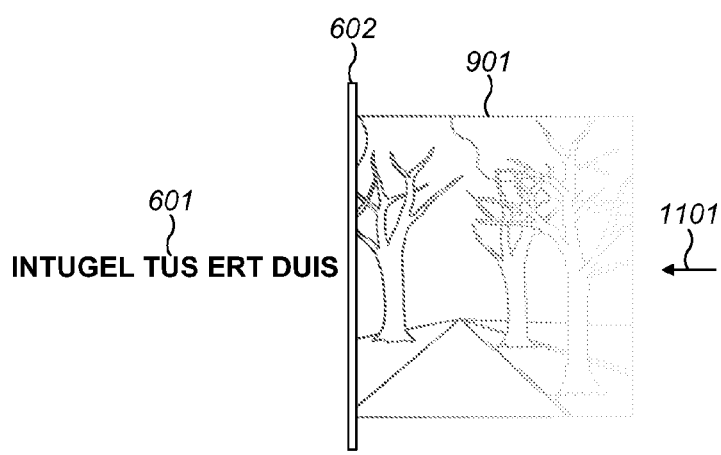
FIG. 11 is an illustration of a fourth exemplary slide transition of a presentation in accordance with example embodiments of the present disclosure.

FIG. 10 illustrates a slide with the image content element 901 in its final position. The title 601 and separating bar 602 remain fixed. FIG. 11 illustrates the disappearance of the image content element 901 as part of a slide transition. In the reverse manner to that illustrated in FIG. 9, the image content element 901 disappears into the separating bar 602 and becomes increasingly transparent as it disappears. The image content element 901 moves in the direction indicated by arrow 1101. As above, the title 601 and separating bar 602 remain fixed. In this exemplary scenario, the content element of the next slide is irrelevant. The image content element 901 has caused a slide transition selected to be selected for it based on its content type.

Figure 12:
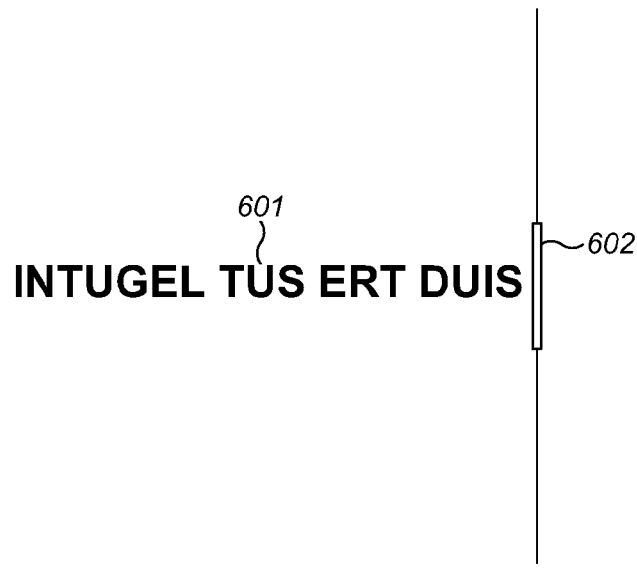
FIG. 12 is an illustration of a third exemplary slide of a presentation in accordance with example embodiments of the present disclosure.
Figure 13:
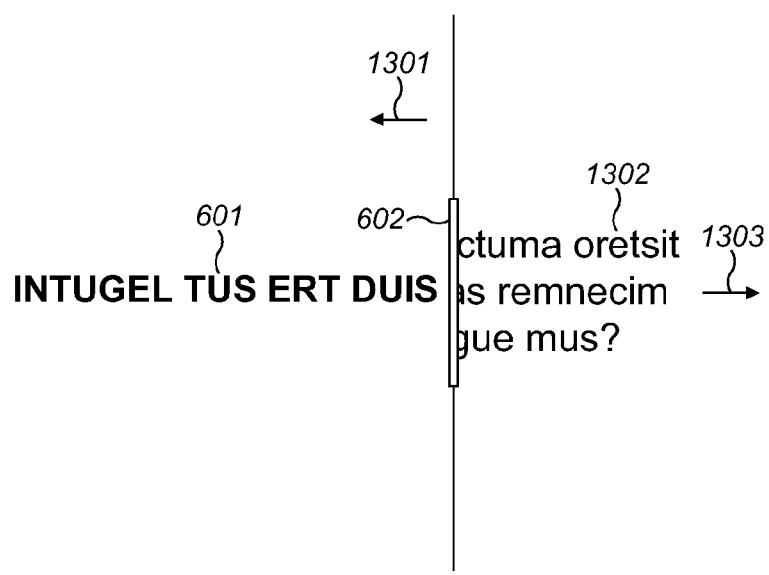
FIG. 13 is an illustration of a fifth exemplary slide transition of a presentation in accordance with example embodiments of the present disclosure.
Figure 14:
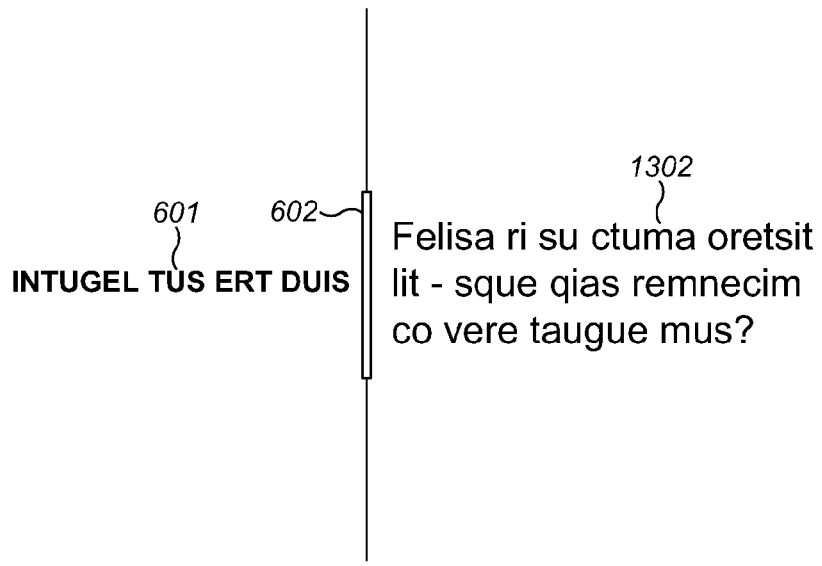
FIG. 14 is an illustration of a fourth exemplary slide of a presentation in accordance with example embodiments of the present disclosure; and, FIG. 15 is a flow diagram showing an example embodiment of the present disclosure.

In the example illustrated in FIGS. 12 to 14, a slide transition between a slide showing a title and a slide showing a text content element is shown. In FIG. 12, the title 601 is shown emboldened and with a large font size, with a separator bar 602 to its right. FIG. 13 illustrates the slide transition that will occur when the presentation generation engine or presentation software has determined that the first slide contains a title content element and the second slide, i.e. the next slide to be displayed in the set, contains a text content element.

The title 601 is reduced in size and the separator bar 602 progressively moves in the direction indicated by arrow 1301 as the title 601 reduces in size. At the same time, the text content element 1302 appears out of the separator bar 602 in the direction indicated by arrow 1303. FIG. 14 illustrates the final resting position of these elements. The title 601 is positioned at its final small size to the left of the separator bar 602, as also illustrated in FIGS. 6 to 11, and the text content element 1302 is fully opaque and positioned to the right of the separator bar 602 and is entirely visible. No part of the text content element 1302 is hidden behind the separator bar 602.

As is clear from the above, the slide transition between slides and for individual content elements of the slides is different depending on the nature and characteristics of the content elements themselves. The examples illustrated should be considered as examples which merely illustrate the concepts described. There are of course myriad slide transitions possible. What is key is that the slide transition is selected based on the content of the displayed slide, the next content of the next slide in the set of slides, or both.

Figure 15:
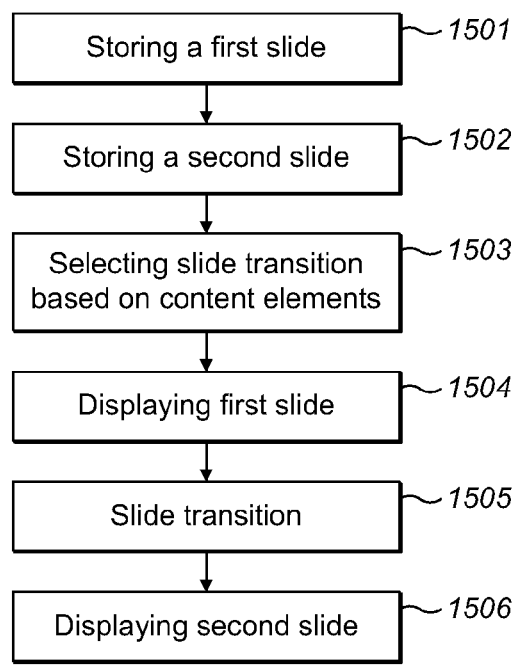

FIG. 15 illustrates a flow diagram of a concept of the present disclosure. At steps 1501 and steps 1502, the first and second slides are stored. At step 1503, the algorithm selects a slide transition based on the content elements of the first or second slides or both. At step 1504, the first slide is displayed. At step 1505, either automatically, upon request by the user or after a predetermined time period, a slide transition occurs which transitions from the first slide to the second slide which is displayed at step 1506.

In a further exemplary embodiment, the automatic transition generation could be used for doing a "live performance" when showing a presentation. The presentation control user interface provided on the electronic device could have two or more different buttons which are used to indicate that the next slide should be displayed. Each button signifies a different slide transition. the automatic slide transition may select two or more appropriate transitions which have different properties. The presenter can then choose which of the appropriate slide transitions to use. For example, one of the options given to the presenter will be the standard slide transition that may be simple and fast. Another of the options may be more grandiose, where the presenter wants to emphasise the next slide or piece of content. Each slide transition, in this example the standard and grandiose options, may be appropriate to the content of the slide and may be selected by the software according to the content. The slide transitions selected by the software may be tailored according to the properties or emphasis the presenter is trying to achieve.

The embodiments described above are merely illustrative of particular implementations and are not meant to be restrictive. Various adaptations, modifications, and combinations of the described embodiments can be made while remaining within the scope of the claims appended.

The invention claimed is:

1. A computer-implemented method of generating a presentation including a plurality of slides, the method comprising:
   storing a first slide and a second slide, each slide having one or more content elements;
   using an algorithm to determine, based on the one or more content elements of the first slide or the second slide or both, two or more slide transitions from a set of slide transitions, wherein the two or more slide transitions have different properties from each other and each slide transition in the set of slide transitions defines how display of one slide changes to display of another slide;
   displaying the first slide;
   receiving a user input that indicates one or more properties that the user would like the slide transition to have;
   determining one of the selected two or more slide transitions in dependence on the received user input; and,
   subsequently changing display of the first slide to display of the second slide in accordance with the determined selected slide transition.

2. The method according to claim 1, wherein the selecting is based on the number of content elements in the first slide or the number of content elements in the second slide or both.

3. The method according to claim 1, wherein the selecting is based on content type of the one or more content elements of the first slide or the content type of the one or more content elements of the second slide or both.

4. The method according to claim 1, wherein the selecting is based on a characteristic of the one or more content elements of the first slide or a characteristic of the one or more content elements of the second slide or both, the characteristic defining an aspect of the graphical appearance and layout of the one or more content elements.

5. The method according to claim 4, wherein the characteristic is selected from the group consisting of: type face, font weight, font size, font colour, image contrast, image saturation, font contrast, font saturation, background colour and background effect.

6. The method according to claim 1, wherein the selecting is based on one or more dimensions of the region covered by the one or more content elements of the first slide or the region covered by the one or more content elements of the second slide or both.

7. The method according to claim 1, wherein the selecting is based on comparison of the one or more content elements of the first slide with the one or more content elements of the second slide.

8. The method according to claim 1, wherein the first slide or second slide or both contains a plurality of content elements of different content types, and wherein the slide transition selected defines a different animation for each content type.

9. An electronic device for generating a presentation including a plurality of slides, the device comprising:
   one or more processors; and,
   memory comprising instructions which, when executed by one or more of the processors, cause the electronic device to:
      store a first slide and a second slide, each slide having one or more content elements;
      use an algorithm to determine, based on the one or more content elements of the first slide or the second slide or both, two or more slide transitions from a set of slide transitions, wherein the two or more slide transitions have different properties from each other and each slide transition in the set of slide transitions defines how display of one slide changes to display of another slide;
      display the first slide;
      receive a user input that indicates one or more properties that the user would like the slide transition to have;
      determine one of the selected two or more slide transitions in dependence on the received user input; and,
      subsequently change display of the first slide to display of the second slide in accordance with the determined selected slide transition.

10. The electronic device according to claim 9, wherein the selecting is based on the number of content elements in the first slide or the number of content elements in the second slide or both.

11. The electronic device according to claim 9, wherein the selecting is based on content type of the one or more content elements of the first slide or the content type of the one or more content elements of the second slide or both.

12. The electronic device according to claim 9, wherein the selecting is based on a characteristic of the one or more content elements of the first slide or a characteristic of the one or more content elements of the second slide or both, the characteristic defining an aspect of the graphical appearance and layout of the one or more content elements.

13. The electronic device according to claim 12, wherein the characteristic is selected from the group consisting of: type face, font weight, font size, font colour, image contrast, image saturation, font contrast, font saturation, background colour and background effect.

14. The electronic device according to claim 9, wherein the selecting is based on one or more dimensions of the respective region covered by the one or more content elements of the first slide or the second slide or both.

15. The electronic device according to claim 9, wherein the selecting is based on comparison of the one or more content elements of the first slide with the one or more content elements of the second slide.

16. The electronic device according to claim 9, wherein the first slide or second slide or both contains a plurality of content elements of different content types, and wherein the slide transition selected defines a different animation for each content type.

17. A computer program product for generating a presentation including a plurality of slides, the computer program product comprising memory comprising instructions which when executed by one or more of the processors of an electronic device cause the electronic device to:
  store a first slide and a second slide, each slide having one or more content elements;
  use an algorithm to determine, based on the one or more content elements of the first slide or the second slide or both, two or more slide transitions from a set of slide transitions, wherein the two or more slide transitions have different properties from each other and each slide transition in the set of slide transitions defines how display of one slide changes to display of another slide;
  display the first slide;
  receive a user input that indicates one or more properties that the user would like the slide transition to have;
  determine one of the selected two or more slide transitions in dependence on the received user input; and,
  subsequently change display of the first slide to display of the second slide in accordance with the determined selected slide transition.

* * * * *